United States Patent
Pacella et al.

(10) Patent No.: US 9,853,870 B2
(45) Date of Patent: Dec. 26, 2017

(54) CONTROLLER SUPPORTED SERVICE MAPS WITHIN A FEDERATION OF FORWARDING BOXES

(71) Applicant: Verizon Patent and Licensing Inc., Basking Ridge, NJ (US)

(72) Inventors: Dante J. Pacella, Charles Town, WV (US); Mani Tadayon, Leesburg, VA (US); Syed A. Ahmad, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 352 days.

(21) Appl. No.: 14/674,260

(22) Filed: Mar. 31, 2015

(65) Prior Publication Data

US 2016/0294644 A1 Oct. 6, 2016

(51) Int. Cl.
*H04L 12/66* (2006.01)
*H04L 12/24* (2006.01)

(52) U.S. Cl.
CPC ...... *H04L 41/5054* (2013.01); *H04L 41/0853* (2013.01); *H04L 41/5058* (2013.01)

(58) Field of Classification Search
CPC . H04L 41/0853; H04L 67/16; H04L 41/5054; H04L 41/5058
See application file for complete search history.

(56) References Cited

U.S. PATENT DOCUMENTS

| | | | | |
|---|---|---|---|---|
| 2015/0215195 A1* | 7/2015 | Raps | ...................... | H04L 45/02 370/254 |
| 2015/0358235 A1* | 12/2015 | Zhang | ................... | H04L 45/745 370/230 |
| 2016/0062746 A1* | 3/2016 | Chiosi | ...................... | G06F 8/35 717/104 |
| 2016/0087845 A1* | 3/2016 | Kaneriya | .............. | H04L 49/351 370/254 |
| 2016/0173338 A1* | 6/2016 | Wolting | ................ | H04L 41/145 709/223 |

* cited by examiner

*Primary Examiner* — Charles C Jiang
*Assistant Examiner* — Ryan Kavleski

(57) ABSTRACT

A controller network device, in a network control layer of a service provider network, receives one or more parameters for providing particular services over a service provider network and provides, to a forwarding network device in a network resources layer of the service provider network, a capabilities query. The capabilities query includes a feature type identifier for a feature required to support the parameters. The controller network device receives, from the forwarding network device, a response to the capabilities query, wherein a format for the response is one of a binary response format, a conditional response format, or a value response format. The controller network device compiles the response with responses from other forwarding network devices to define a network map for supporting the particular services.

20 Claims, 8 Drawing Sheets

US 9,853,870 B2

1

CONTROLLER SUPPORTED SERVICE MAPS WITHIN A FEDERATION OF FORWARDING BOXES

BACKGROUND

In software-defined networking (SDN), network administrators can manage network services through abstraction of lower-level functionality. Control plane devices communicate with forwarding plane devices to direct flows and services.

DETAILED DESCRIPTION OF PREFERRED EMBODIMENTS

The following detailed description refers to the accompanying drawings. The same reference numbers in different drawings may identify the same or similar elements.

An object of software defined networking (SDN) is decoupling of the network control plane from the network forwarding plane. Communications between the control plane and the forwarding (or resources) plane occur over what may be called a southbound interface. In a network federation, where vendors of multiple network devices may agree on standards, there may be standards defining, for example, communications among devices and/or minimum system requirements. Ideally, network devices within the federation may perform identically, regardless of the manufacturing vendor. However, in practice, generational differences among network devices may occur over time, as well as minor variations between vendor configurations (e.g., hardware and firmware), which may result in differences in network device capabilities.

New service offerings within a network may require that network elements have particular capabilities (e.g., buffer depth, buffer management, queues supported, etc.). Thus, while network elements in an SDN would ideally provide "plug and play" interoperability, more precise tracking of individual network elements within the federation is needed to ensure that a network can optimally support certain types of network services, such as particular service flows. According to implementations described herein, network devices in the resources plane may communicate over a southbound interface to disclose features and performance metadata to network devices in the control plane. These features may be mapped to show the topology and capabilities of a network particularly related to specific services. According to one implementation, multiple virtual topologies may be mapped based on support for particular services.

Figure 1:
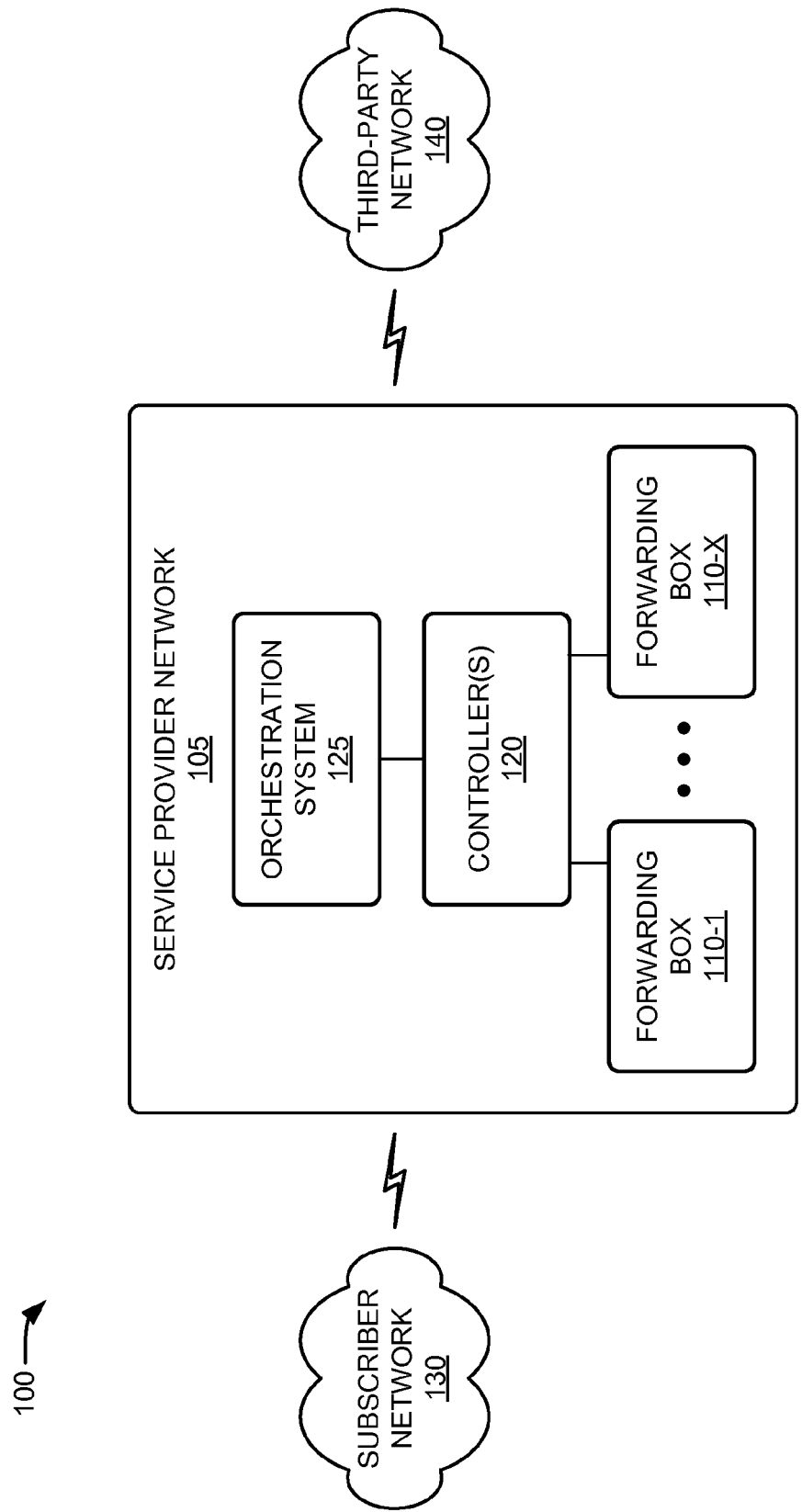
FIG. 1 is a diagram illustrating an exemplary network environment in which systems and/or methods described herein may be implemented.

FIG. 1 is a diagram illustrating an exemplary network environment 100 in which systems and/or methods described herein may be implemented. As illustrated, network environment 100 may include a service provider network 105 including multiple forwarding boxes 110-1 through 110-X (collectively "forwarding boxes 110" and individually "forwarding box 110"), one or more controllers 120, and one or more service orchestration systems 125; a subscriber network 130; and a third-party network 140. In practice, network environment 100 may include additional elements than those illustrated in FIG. 1.

Service provider network 105 may include one or more wired, wireless and/or optical networks that are capable of receiving and transmitting data, voice and/or video signals, including multi-media signals that may include voice, data and video information (generally referred to herein as "services"). Service provider network 105 may include one or more wired and/or wireless networks via which a device in subscriber network 130 may communicate and/or receive content. For example, service provider network 105 may include a wide area network (WAN), a metropolitan area network (MAN), an ad hoc network, an intranet, a fiber optic-based network, and/or a combination of these or other types of networks. Additionally or alternatively, service provider network 105 may include a cellular network, the Public Land Mobile Network (PLMN), and/or another mobile network. According to implementations described herein, service provider network 105 may employ Software Defined Networking (SDN) tools and conventions, including a separate service orchestration layer, control layer, and resources (or forwarding) layer.

Forwarding box 110 may include a data transfer device, such as a router, a gateway, a switch (e.g., an asynchronous transfer mode (ATM) switch), a firewall, a network interface card (NIC), a hub, a bridge, a proxy server, an optical add-drop multiplexer (OADM), a line access multiplexer (LAM), or some other type of device that processes and/or transfers data. In other implementations, forwarding box 110 may include a computing devices or network device. Each forwarding box 110 may be included within a forwarding layer of service provider network 105. In one example, one or more forwarding box 110 may be capable of establishing an end-to-end path between subscriber network 130 and third-party network 140. Forwarding box 110 may store performance metadata and physical configuration data that may affect the ability of forwarding box 110 to support services over service provider network 105. According to implementations described herein, forwarding box 110 may respond to capabilities queries from controller 120 to communicate particular performance metadata and/or configurations via a southbound interface within an SDN environment. In one implementation, the format for the responses may be provided in one of three distinct structures: a binary response format, a conditional response format, or a value response format.

Controller 120 may include computing devices or network devices that provide control plane functionality to direct data flows to/from subscriber network 130 (or user devices in subscriber network 130). Each controller 120 may be included within a control layer of service provider network 105. Controller 120 may include an application that manages flow control to enable intelligent networking. In one implementation, controller 120 may translate commands from an orchestration layer (e.g., orchestration system 125) into a format that can be used with forwarding boxes 110. For example, controller 120 may communicate with forwarding boxes 110 and other elements of service provider network 105 to manage data flows from one endpoint to another. In one implementation, controller 120 may use modifications to existing protocols, such as extensions to OpenFlow. Controller 120 may generate and send capabilities queries to forwarding boxes 110 via a southbound interface and may receive responses to the capabilities queries via the southbound interface.

Orchestration system 125 may provide an interface from user devices to systems associated with service provider network 105 through orchestration layer application programming interfaces (APIs). Orchestration system 125 may support interactions between client devices and network devices associated with the service provider network 105. Orchestration system 125 may determine particular data formats to be used according to the services that a customer requests. Orchestration system 125 may also perform business functions such as controlling access to available services, providing catalogs of available services, managing customer orders, managing user profiles, and managing content licenses. Orchestration system 125 may also manage quality controls, track network resources, and manage workflows. In one implementation, orchestration system 125 may communicate data (e.g., requirements for particular services) to controller 120 via a northbound interface in an SDN environment.

Subscriber network 130 may represent a local area network (LAN or a home network) of a subscriber to services offered by the service provider of service provider network 105. In some implementation, subscriber network 130 may connect to service provider network 105 via a wired access network (not shown) or a direct connection. In other implementations, one or more devices in subscriber network 130 may also connect to service provider network 105 via a wireless access network. Devices in subscriber network 130 may include, for example, one or more routers and/or user devices, such as a set-top box, a computer (e.g., a personal, tablet, or wearable computer), an internet television, a smart phone, a gaming system, or another device.

Third-party network 140 may include one or more server devices, or other types of computation or communication devices, that gather, process, search, and/or provide information in a manner described herein. In one implementation, third-party network 140 may include a computer system, an application, and/or a broadcasting device. Third-party network 140 may include, for example, IP content distribution facilities (e.g., IPTV). In one implementation, third-party network 140 may provide multimedia content that can be presented to a user on a user device in subscriber network 130.

In an ideal environment, each forwarding box 110 within service provider network 105 may have uniform features and capabilities. However, even if all forwarding boxes 110 are uniform in features, over time, those features will likely diverge, either between forwarding boxes from different vendors (e.g., looking for marketplace separation) or from the same vendor (e.g., over different product line generations). Furthermore, unless all forwarding boxes 110 in service provider network 105 are from the same vendor, same model, and same scale there will likely be feature gaps or performance differences in minor aspects of forwarding boxes 110 even in a network-wide launch of new systems. For example, manufacturers may provide forwarding boxes 110 with differences in generic aspects, such as performance metrics (e.g., packets-per-second that forwarding box 110 can support, entry updates per second, etc.), media access and control (MAC) table size, buffer sizes, number of queues, number of adjacencies per routing protocol, maximum number of tunnels or virtual LANs (VLANs), physical interfaces, minimum granularity for policers, rate of locally-generated packets, etc. Manufacturers may also provide forwarding boxes 110 with differences in features, such as support of Priority Flow Control (PFC) or Datagram Congestion Control Protocol (DCCP), especially in response to meeting service provider requests.

Given the potential differentiation in forwarding boxes 110, each forwarding box 110 needs to be able to communicate its features and performance metadata to controller 120. To facilitate the required communication, the network operating system (NOS) (e.g., managed via controllers 120) needs to have a common framework to understand each forwarding box 110's functions and specifications. According to one implementation, upon device discovery or a firmware update of a forwarding box 110, controller 120 can query forwarding boxes 110 about parameters that are of interest to controller 120, and each forwarding box 110 must respond with either a binary response, a conditional response, or a value response to each parameter queried.

In FIG. 1, the particular arrangement and number of components of network environment 100 are illustrated for simplicity. In practice there may be more service provider networks 105, forwarding boxes 110, controllers 120, subscriber networks 130, and/or third-party networks 140. Components of network environment 100 may be connected via wired and/or wireless links.

Figure 2:
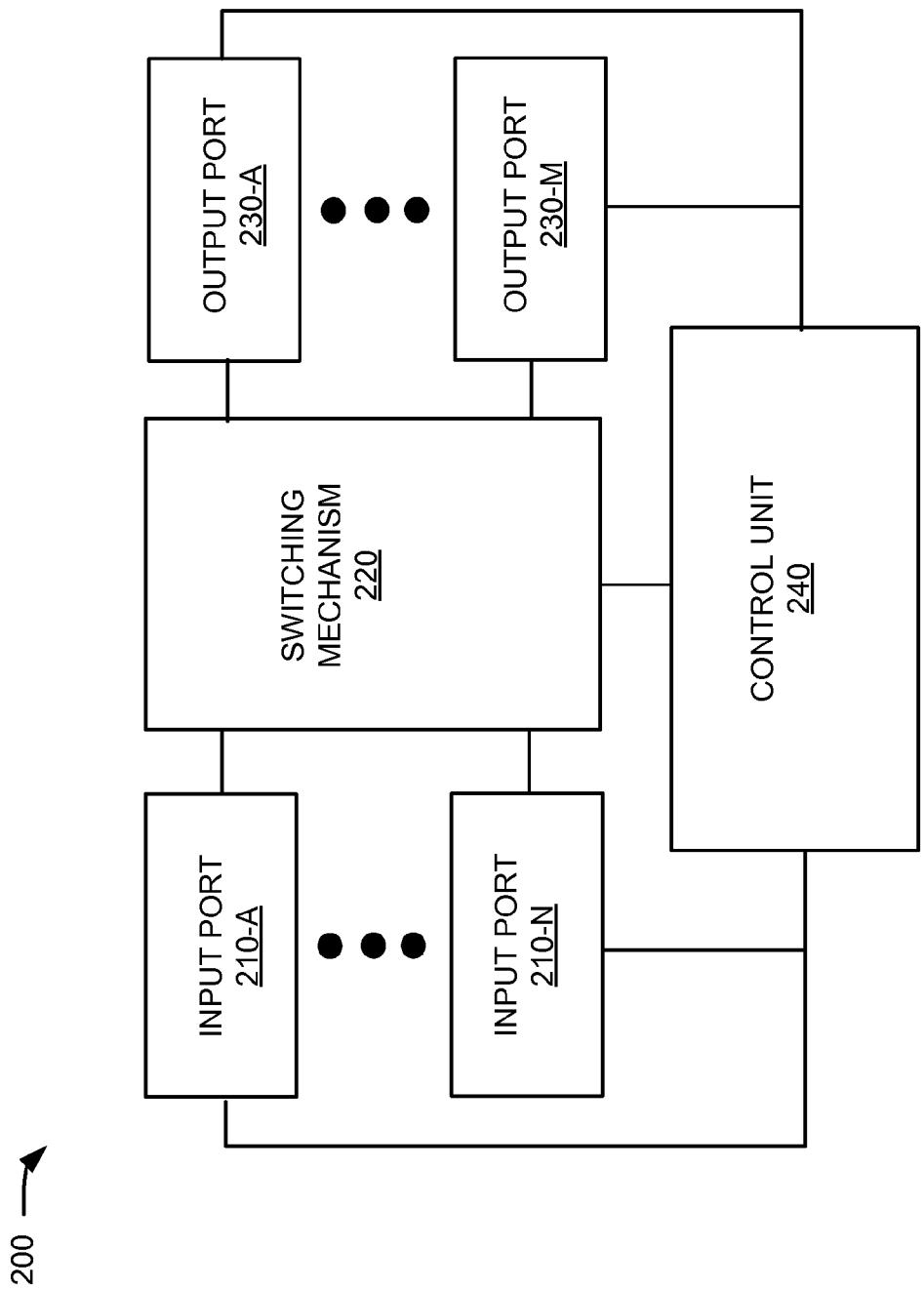
FIG. 2 is a diagram illustrating exemplary components of a routing device that may correspond to one of the devices of FIG. 1.

FIG. 2 is a diagram illustrating exemplary components of routing device 200. In some implementations, forwarding box 110 may be included within routing device 200. As shown in FIG. 2, routing device 200 may include one or more input ports 210-A to 210-N (referred to herein individually as "input port 210" and collectively as "input ports 210"), a switching mechanism 220, one or more output ports 230-A to 230-M (referred to herein individually as "output port 230" and collectively as "output ports 230"), and a control unit 240.

Input ports 210 may be the points of attachments for physical links and may be the points of entry for incoming traffic. An input port 210 may be associated with an interface card. Input port 210 may perform some or all of data plane processing associated with an incoming packet. Data plane processing may encompass looking up a destination address for an incoming packet, removing (or changing) a label associated with the packet, determining a path through switching mechanism 220, and/or filtering the packet based on one or more filters.

Switching mechanism 220 may include one or more switches and/or switch fabrics to facilitate communication between input ports 210 and output ports 230. In one implementation, each of the switch fabrics may include a single or multi-stage switch of crossbar elements. In another implementation, each of the switching planes may include some other form(s) of switching elements. Additionally or alternatively, switching mechanism 220 may include one or more processors, one or more memories, and/or one or more paths that permit communication between input ports 210 and output ports 230.

Output ports 230 may store traffic received from input ports 210 and may schedule the traffic on one or more output physical links. An output port 230 may be associated with an interface card. Output port 230 may perform some or all of data plane processing associated with an outgoing packet. For example, output port 230 may classify the packet based on a quality of service class, schedule the packet in a particular queue, add (or change) a label associated with the packet, and/or filter the packet based on one or more firewall filters.

Control unit 240 may interconnect with input ports 210, switching mechanism 220, and/or output ports 230 and may control operation of routing device 200. For example, control unit 240 may communicate with controller 120 to perform control plane operations associated with routing device 200 (e.g., control unit 240 may communicate features and performance metadata of device 200 to controller 120 for use in routing tables and/or forwarding tables that are used in traffic forwarding).

Although FIG. 2 shows exemplary components of routing device 200, in other implementations, routing device 200 may include fewer components, different components, differently arranged components, and/or additional components than depicted in FIG. 2. Additionally or alternatively, one or more components of routing device 200 may perform one or more tasks described as being performed by one or more other components of routing device 200.

Figure 3:
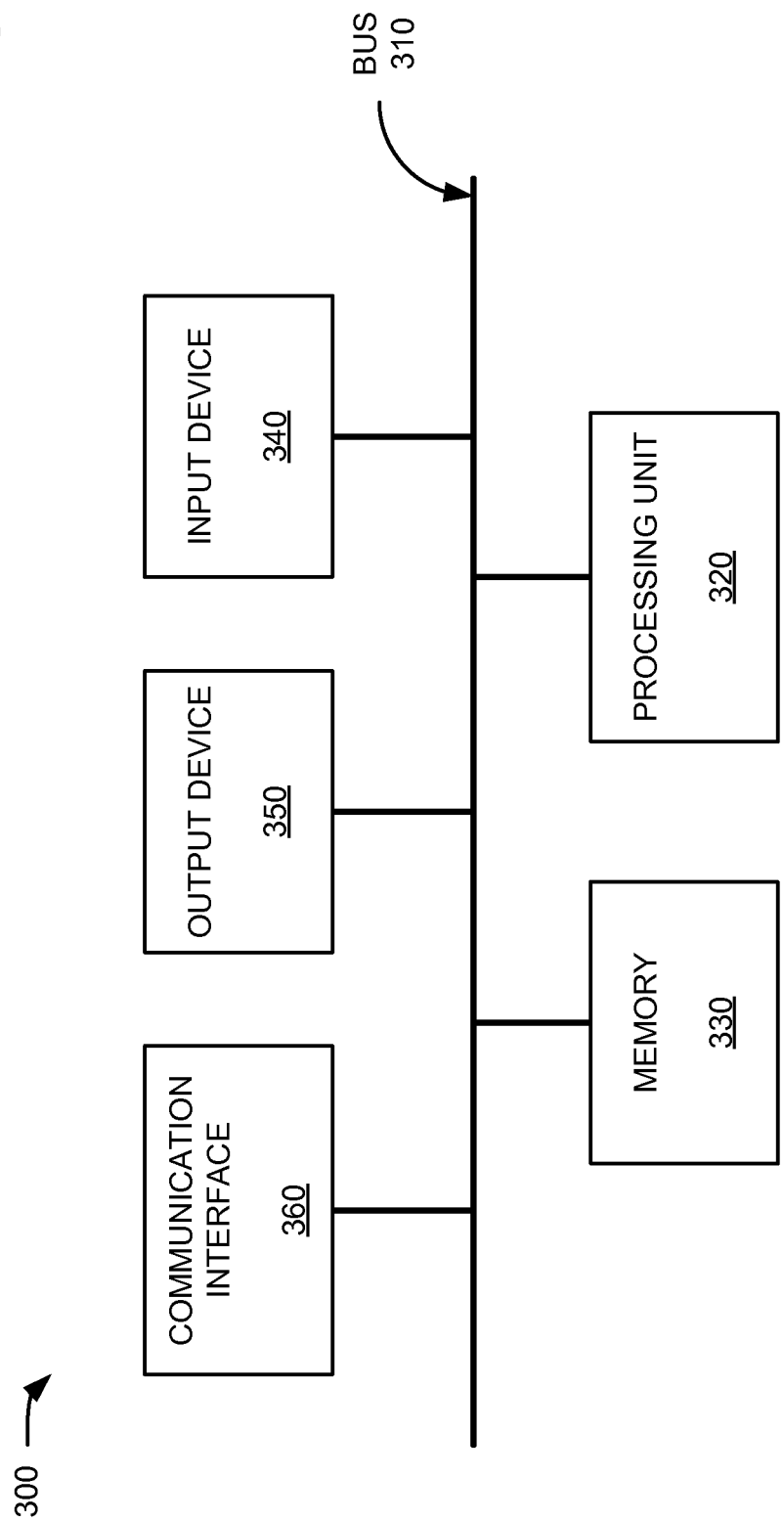
FIG. 3 is a diagram illustrating exemplary components of a computing device that may correspond to one of the devices of FIG. 1.

FIG. 3 is a diagram of exemplary components of a device 300. Each of controller 120 and other devices in service provider network 105, subscriber network 130, and third-party network 140 may be implemented/installed as software, hardware, or a combination of hardware and software, on its respective device 300. In some implementations, forwarding box 110 may also be included within device 300. As shown in FIG. 3, device 300 may include a bus 310, a processing unit 320, a memory 330, an input device 340, an output device 350, and a communication interface 360. In one implementation, device 300 may be configured as a network device that communicates over a network via communication interface 360. In another implementation, device 300 may be configured as part of a set-top box or media server.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, a remote control, one or more biometric mechanisms, and the like. Output device 350 may include a device that outputs information to the operator, such as a display, a speaker, etc.

Communication interface 360 may include a transceiver that enables device 300 to communicate with other devices and/or systems. For example, communication interface 360 may include mechanisms for communicating with other devices, such as other devices in network environment 100. Each of such other devices of network environment 100 may include its respective communication interface 360 to achieve such communication.

As described herein, device 300 may perform certain operations in response to processing unit 320 executing software instructions contained in a computer-readable medium, such as memory 330. A computer-readable medium may include a tangible, non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently arranged components, or additional components than those depicted in FIG. 3. As an example, in some implementations, a display may not be included in device 300. Alternatively, or additionally, one or more components of device 300 may perform one or more other tasks described as being performed by one or more other components of device 300.

Figure 4:
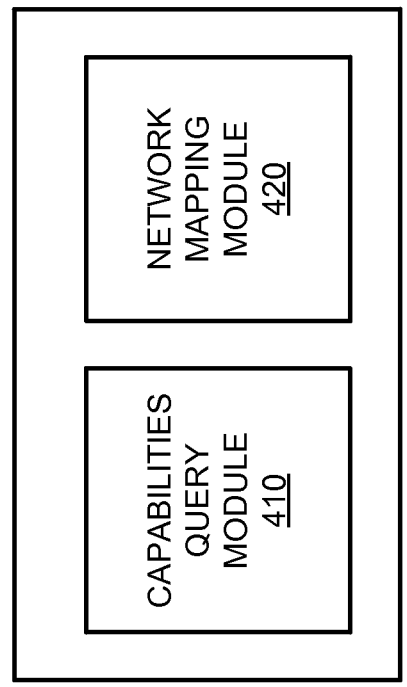
FIG. 4 is a block diagram of exemplary functional components of the controller of FIG. 1.

FIG. 4 is a block diagram of exemplary functional components of controller 120. The functions described in connections with FIG. 4 may be performed by one or more components of device 300 (FIG. 3). As shown in FIG. 4, controller 120 may include a capabilities query module 410 and a network mapping module 420.

Capabilities query module 410 may receive network requirements and desired network behavior from applications within service provider network 105 or third-party network 140. Capabilities query module 410 may structure queries for forwarding boxes 110 based on the network requirements and desired network behavior. The network controller 120 may use capabilities query module 410 to perform inventory for all connected forwarding boxes 110. Examples of such inventory include (but are not limited to): a number and type of physical line cards, a number and type (speed) of ports per line card, optical characteristic/capabilities of the ports (e.g. SX, LX, or EX Gigabit Ethernet Standards), a number of policers per line card, a number of queues per line card, local computing resources on a forwarding box 110, local storage resources on a forwarding box 110, etc.

Capabilities query module 410 may discover when a new forwarding box 110 comes online and/or when forwarding box 110 advertises a firmware update or a new card. For example, auto-discovery or self-discovery may be used to identify forwarding box activation. Auto-discovery may be used for activation of forwarding boxes 110 by controller 120. In this example, controller 120 can probe the network (e.g., service provider network 105) for new forwarding boxes 110 and can securely admit them into the overall network fabric. This auto-discovery process may be particularly useful for network managed forwarding boxes 110, where some level of base configurations can be prepopulated for tighter network integration. Self-discovery, on the other hand, can be initiated in the opposite direction. Thus, forwarding box 110 is brought online in a non-managed environment and network related information, such as IP addresses, cannot be preplanned for proactive probing. In one implementation of this self-discovery process, forwarding box 110 can be brought online and can query the predefined controller(s) 120 for activation and admission. In another implementation of the self-discovery process, controllers 120 can establish an exception path for self-discovery messages to be forwarded from the last-in-line forwarding box 110 up to either its negotiated controller 120 or another controller 120 that has been designated for discovery and controller assignment. Discovery for forwarding box 110 may trigger capabilities query module 410 to send a query to the particular forwarding box 110 to obtain particular features and performance metadata from the particular forwarding box 110. In another implementation, a new type of service introduced for service provider network may trigger capabilities query module 410 to send out a query to all forwarding boxes 110 to assess capabilities of forwarding boxes 110 for the new type of service.

Network mapping module 420 may apply forwarding box 110 responses to capabilities queries to generate a network map of service provider network 105. Network mapping module 420 may interpret the different responses to capabilities queries (i.e., binary response format, conditional response format, and value response format described further below) and compile responses from multiple forwarding boxes 110 into a network map or set of maps. The network map may include, for example, a view of the topology and capabilities of service provider network 105. In one implementation, network mapping module 420 may generate a map targeted toward providing a particular service or services (e.g., services required by applications using service provider network 105). For example, if a particular service requires a known minimum buffer size, network mapping module 420 may map only nodes (e.g., forwarding boxes 110) that have been indicated as being able to support the required minimum buffer size. In another implementation, network mapping module 420 may provide raw data collected from forwarding boxes 110 to orchestration system 125 for mapping.

Although FIG. 4 shows exemplary functional components of controller 120, in other implementations, controller 120 may include fewer functional components, different functional components, or additional functional components than those depicted in FIG. 4. For example, in other implementations, controller 120 may include interfaces to communicate with other controllers 120 (e.g., within a federation) and/or to receive policy updates from other systems.

Figure 5:
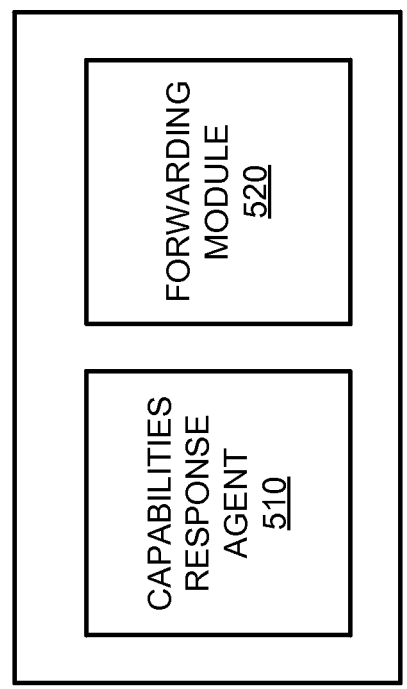
FIG. 5 is a block diagram of exemplary functional components of the forwarding box of FIG. 1.

FIG. 5 is a block diagram of exemplary functional components of forwarding box 110. The functions described in connections with FIG. 5 may be performed by one or more components of device 200 (FIG. 2). As shown in FIG. 5, forwarding box 110 may include a capabilities response agent 510 and a forwarding module 520.

Capabilities response agent 510 may receive a capabilities query from capabilities query module 410. Capabilities response agent 510 may conduct a feature lookup responsive to the capabilities query and may provide a query response to capabilities query module 410. In one implementation, capabilities response agent 510 may communicate with other applications or operating systems to collect responsive information. For example, some information may be encoded into a local operating system governing the firmware of forwarding box 110. In another implementation, capabilities response agent 510 may query the host central processing unit of forwarding box 110. Capabilities response agent 510 may provide responses to capabilities queries in one of three possible formats: a binary response format, a conditional response format, or a value response format. These formats are described further in connection with FIG. 6. The particular format may be indicated in the capabilities request, driven based on the feature indicated in the capabilities request, and/or determined by capabilities response agent 510 (e.g., based on the type of responsive data).

Forwarding module 520 may perform forwarding plane functions that are directed by controller 120 to route traffic across service provider network 105. For example, forwarding module 520 may implement Quality of Service (QoS), traffic shaping, policing, queuing, encapsulation, failure detection, bidirectional forwarding detection (BFD), fast reroute (FRR), packet replication, and/or packet filtering. Forwarding module 520 may also perform other data collection and monitoring functions.

Although FIG. 5 shows exemplary functional components of forwarding box 110, in other implementations, forwarding box 110 may include fewer components, different components, or additional components than those depicted in FIG. 5.

Figure 6:
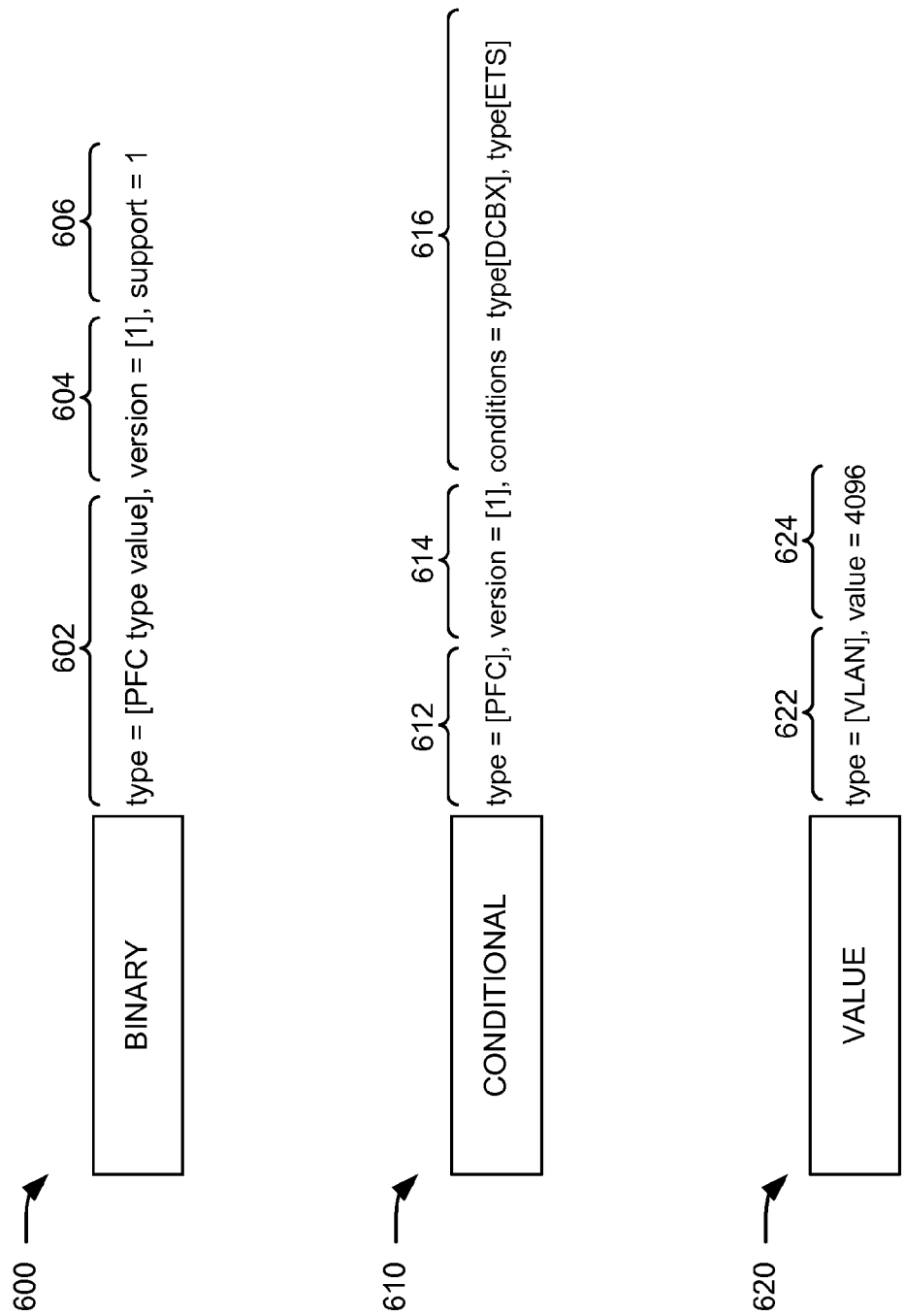
FIG. 6 is a diagram illustrating exemplary structures of different query responses that may be provided by the forwarding box of FIG. 1.

FIG. 6 illustrates exemplary structures for different query responses that may be provided by forwarding box 110. Particularly, FIG. 6 includes a binary response structure 600, a conditional response structure 610, and a value response structure 620. For each parameter queried by controller 120, forwarding box 110 may respond with one of a binary response (e.g., using structure 600), a conditional response (e.g., using structure 610), or a value response (e.g., using structure 620).

Binary response structure 600 may include fields to define a binary response to a capabilities query. In one implementation, use of binary response structure 600 by forwarding box 110 may be expressly requested in the capabilities query from controller 120. In another implementation, the use of binary response structure 600 may be determined by forwarding box 110 based on the type of information requested in the capabilities query from controller 120. Binary response structure 600 may be used to indicate a simple binary (yes/no) response of whether forwarding box 110 can support a particular feature of a capabilities query. Binary response structure 600 may include, for example, a type indicator field 602, a version indicator field 604, and a binary response field 606. Type indicator field 602 may indicate the type of feature/parameter for which forwarding box 110 is providing a capability indication. Type indicator field 602 may include, for example, a previously-selected character or alphanumeric value designating the queried feature. Types in type indicator field 602 may include, for example, "PFC" (for Priority Flow Control, as shown in FIG. 6) and "DCCP" (for Datagram Congestion Control Protocol). Other types of features/parameters that may be identified in type indicator field 602 of binary response structure 600 include, without limitation, port mirroring (e.g., ability to copy all payload content received on a port, while swapping framing); port capture (e.g., ability to copy all contents from a port, including framing); tcpdump (e.g., for sessions terminated to local host or, in the case of forwarding box 110, sessions tunneled to remote host); flow mirroring (e.g., ability to copy all payload content received matching a given 5-tuple flow characteristic); queue high water mark (e.g., ability to measure the greatest fill level for a given queue across all ports or individual ports); open flow for IPv6; Bit Index Explicit Replication (BIER) or other multicast replication; time-stamped latency instrumentation for in-line flows; in-service software upgrade (ISSU); service chaining (e.g., label functions, such as pop, swap, push; VLAN swapping; or other bridging or framing transitions); double-VLAN tag imposition/disposition or switching; segment routing (e.g., SR forwarding information base (FIB)); access tunneling; particular encryption types; Q-in-Q tunneling (e.g., per IEEE 802.1ad); Precision Time Protocol (PTP); proxy Address Resolution Protocol (ARP); and load index (LI), LI flow balancing, and LI chain of custody Version indicator field 604 may include a particular version of the type identified in type indicator field 602. A default value for version indicator field 604 may include, for example, "1.0." Binary response field 606 may include an indication (e.g., yes/no) of whether the type and version indicated in type indicator field 602 and version indicator field 604 are supported by forwarding box 110. In one implementation, binary response filed may include a "1" to indicate that the type and version are supported and a "0" to indicate that the type and version are not supported.

Conditional response structure 610 may include fields to define a conditional response to a capabilities query. In one implementation, use of conditional response structure 610 by forwarding box 110 may be expressly requested in the capabilities query from controller 120. In another implementation, the use of conditional response structure 610 may be determined by forwarding box 110 based on the type of information requested in the capabilities query from controller 120. Conditional response structure 610 may be used to indicate a conditional response of whether forwarding box 110 can support a particular feature of a capabilities query. Conditional response structure 610 may include, for example, a type indicator field 612, a version indicator field 614, and a conditions field 616. Type indicator field 612 may indicate the type of feature for which forwarding box 110 is providing a capability indication. Version indicator field 614 may include a particular version of the type identified in type indicator field 612.

Conditions field 616 may indicate what capabilities must be active on forwarding box 110 to support the queried feature. In one implementation, revision numbers may also be included with conditions in conditions field 616. Conditions in conditions field 616 may generally be used to indicate that forwarding box 110 needs something else activated/deactivated in order to support a queried feature. An example would be priority flow control: forwarding box 110 may identify other conditions that must be met in order to activate priority flow control, and those conditions may change for a forwarding box 110 made by one vendor and a forwarding box 110 made by another vendor. For priority flow control ("PFC") version 1.0, conditions in conditions field 616 may include, for example, type "DCBX" (Datacenter Bridging Capabilities Exchange Protocol), type "ETS" (Enhanced Transmission Selection), etc. Other types of features/parameters that may be identified in type indicator field 612 and conditions field 616 of conditional response structure 610 include, without limitation, LI chain of custody requirements (e.g., PTP, Q-in-Q, time-stamping); packet per second (PPS) with time-stamping; PPS with Internet Protocol security (IPSec); PPS with time-stamping & IPSec; packet replication (e.g., if not using leaf and branch on the same node); latency instrumentation (e.g., if PTP and Time-stamping are active); and queue high water mark (if not using Q-in-Q).

Value response structure 620 may include fields to define a binary response to a capabilities query. In one implementation, use of value response structure 620 by forwarding box 110 may be expressly requested in the capabilities query from controller 120. In another implementation, the use of value response structure 620 may be determined by forwarding box 110 based on the type of information requested in the capabilities query from controller 120. Value response structure 620 may be used to indicate a simple value response for a particular feature of a capabilities query. Value response structure 620 may include, for example, a type indicator field 622 and a value response field 624. Type indicator field 602 may indicate the type of feature for which forwarding box 110 is providing a capability indication. Types in type indicator field 622 may include, for example, "VLAN" (for virtual local area network, as shown in FIG. 6). Other types of features/parameters that may be identified in type indicator field 622 of value response structure 620 include, without limitation, label stack depth; packet-per-second performance; bit-per-second performance; Open Flow entries; number of queues; table sizes, such as segment routing FIB size, Layer 2 FIB size, Layer 3 FIB size (for unicast, multicast, IPv4, IPv6); timestamp granularity (e.g., in microseconds, nanoseconds, etc.); timestamp accuracy; ARP entries; MAC address learning; number of logical interfaces (VLANs, tunnels, LSPs, P2MP branches/leafs, etc.).

Value response field 624 may include a value (e.g., a numeric value) corresponding to the type identified in type indicator field 622. The value may reflect a capability of forwarding box 110. For example, in one implementation, a value between 0 and 4096 (or binary equivalents) may be used to indicate the number of VLANs supported by forwarding box 110. In one implementation, the values used in value response indicator field 624 may be identified, for example, based on factory testing prior to deployment of forwarding box 110. In another implementation, the values used in value response indicator field 624 may be learned by forwarding box 110 based on initialization tests in production (e.g., the particular tested unit, on a particular power plant, with an observed cooling coefficient, handles only a particular percentage of an advertised PPS rate or other capability). The learned value could be periodically tested to update the learned value.

Although FIG. 6 provides exemplary structures of different query responses that may be provided by forwarding box 110, in other implementations, forwarding box 110 may provide additional or different structures for query responses from controller 120.

Figure 7:
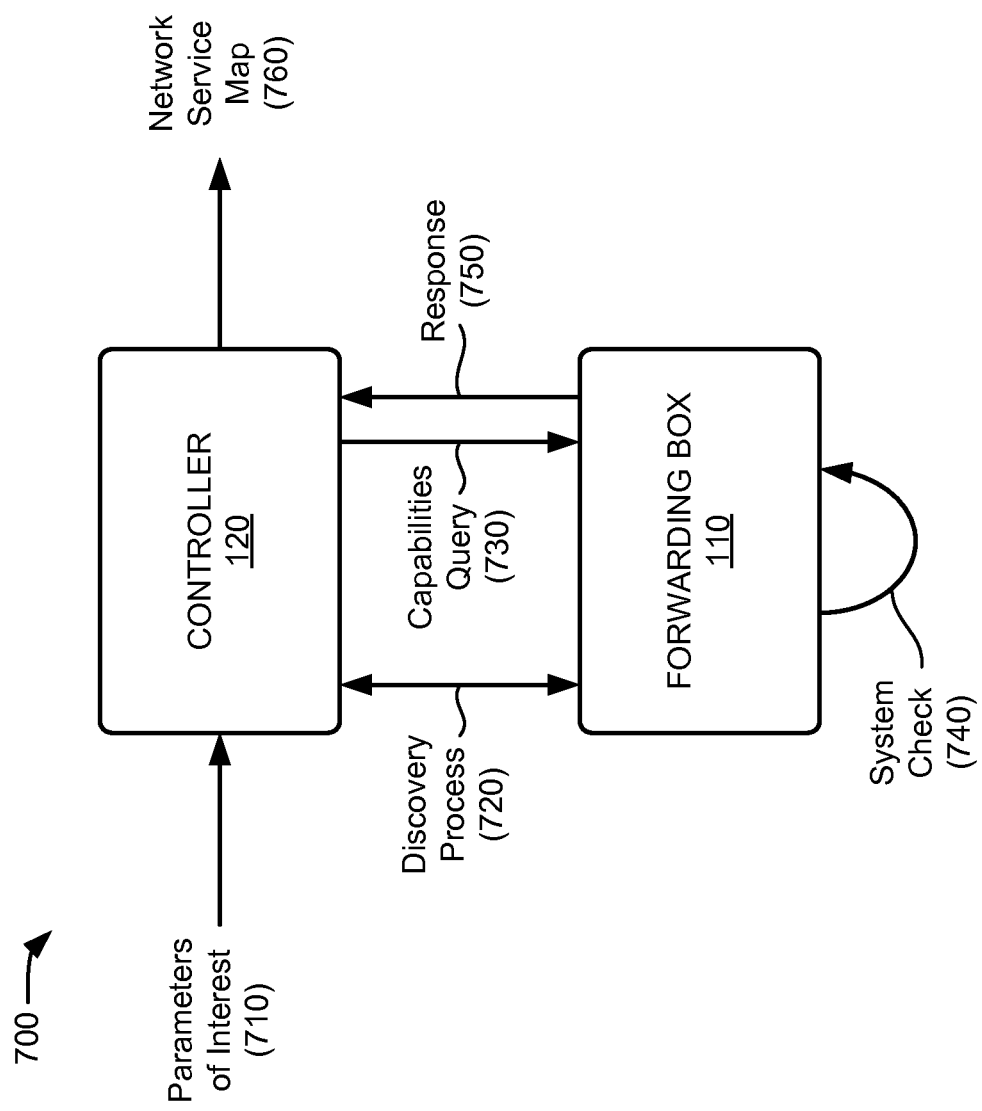
FIG. 7 is a diagram of exemplary communications among devices within a portion of the service provider network of FIG. 1.

FIG. 7 is a diagram of exemplary communications among devices within a portion 700 of service provider network 105. Communications in FIG. 7 may represent simplified communications for generating a network service map. As shown in FIG. 7, network portion 700 may include forwarding box 110 and controller 120. Forwarding box 110 and controller 120 may include features described above in connection with, for example, FIGS. 1-6.

As shown in FIG. 7, parameters of interest 710 may be provided to controller 120. Parameters of interest 710 may include, for example, parameters necessary for forwarding boxes 110 to support a particular service across service provider network 105 (e.g., using priority flow control, supporting a minimum number of VLANs, providing minimum buffer sizes, etc.).

Controller 120 and forwarding box 110 may perform a discovery process 720. Discovery process 720 may include an auto-discovery process or a self-discovery process to identify forwarding box 110 as available for providing services within service provider network 105. Upon discovery, controller 120 may provide a capabilities query 730 to forwarding box 110. Capabilities query 730 may include, for example, a list of parameter types of interest to controller 120. In one implementation, capabilities query 730 may also include a required response format (e.g., binary, conditional, or value) for forwarding box 110 to use. In still another implementation, capabilities query 730 may also include a version number or other information to allow forwarding box 110 to provide an accurate response to capabilities query 730.

In one implementation, forwarding box 110 (e.g., capabilities response agent 510) may conduct a system check 740 to identify data for a response to capabilities query 730. In one implementation, system check 740 may include retrieving stored values from system configuration files or other stored values. In another implementation, system check 740 may include performing a test (e.g., a speed test, etc.) to obtain a response value.

Based on system check 740, forwarding box 110 may provide a response 750 to controller 120. A format for response 750 may be selected, for example, from a group of predefined response structures, such as one of binary response structure 600, conditional response structure 610, or value response structure 620 of FIG. 6.

Controller 120 may receive response 750 and compile response 750 with responses from other forwarding boxes 110 to generate a network service map 760. Network services map 760 may include, for example, a view of the topology and capabilities of service provider network 105. In one implementation, network services map 760 may be targeted toward provision of a particular service or services (e.g., services required by applications using service provider network 105).

Depending on a size of response 750, each capabilities query 730 may result in forwarding box 110 sending multiple response packets using one or more of response structures 600, 610, and 620 from FIG. 6. Also, depending on the number of parameters of interest 710, there may be multiple capabilities queries 730. In some instances, a capabilities query 730 may result in recursive queries (e.g., Query1: is v3 of a parameter supported? Response1: no. Query2: is v2 of the parameter supported? R2: yes). In another implementation, message consolidation can occur with a response 750 being conditional (e.g., Query1: is v3 of a parameter supported? Response1: no, but v2 is supported).

Although FIG. 7 shows exemplary communications within network portion 700, in other implementations, network portion 700 may include fewer communications, different communications, and/or additional communications than those depicted in FIG. 7. Alternatively, or additionally, one or more components of network portion 700 may perform one or more other tasks described as being performed by one or more other components of network portion 700.

Figure 8:
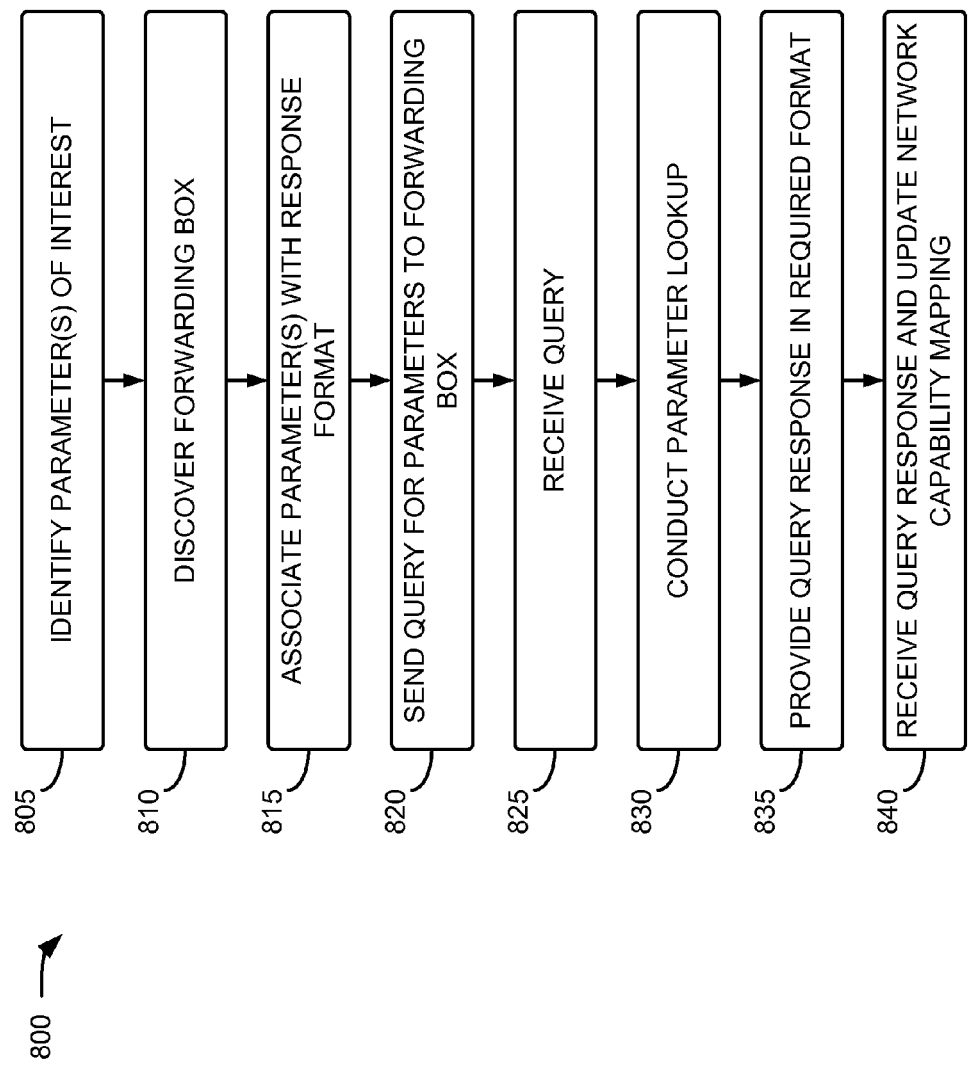
FIG. 8 is a flow diagram of an exemplary process for providing a service map within a federation of forwarding boxes according to an implementation described herein.

FIG. 8 is a flow diagram of an exemplary process 800 for providing a service map within a federation of forwarding boxes. In one implementation, process 800 may be performed by one or more devices from service provider network 105 (including, for example, forwarding boxes 110 and controller 120). In another implementation, process 800 may be performed by one or more devices from service provider network 105 in conjunction with other devices.

Process 800 may include identifying parameters of interest (block 805) and discovering a forwarding box (block 810). For example, controller 120 may receive, from orchestration system 125, parameters needed for supporting a particular service over service provider network 105. Controller 120 may store the parameters as parameters of interest. A forwarding box 110 may be discovered via an auto-discovery or self-discovery process to indicate that an forwarding box 110 is available for providing services within service provider network 105.

Process 800 may also include associating the parameters with a response format (block 815), and sending a query for the parameters to the forwarding box (block 820). For example, controller 120 (e.g., capabilities query module 410) may retrieve the parameters of interest and generate a capabilities query (e.g., capabilities query 730) for forwarding box 110. In one implementation, the capabilities query may include an indication (or type) of the parameters of interest and a required response format (e.g., binary, conditional, or value) for each parameter of interest. Controller 120 may send the capabilities query to forwarding box 110 (e.g., via a southbound interface).

Process 800 may further include receiving the query (block 825), conducting a parameter lookup (block 830), and providing a query response in the required format (block 835). For example, forwarding box 110 (e.g., capabilities response agent 510) may receive the capabilities query from controller 120 and conduct a system check to identify data for a response. In one implementation, system check 740 may include retrieving stored values from system configuration files or other stored values. Forwarding box 110 may provide a response (e.g., response 750) to controller 120. A format for the response 750 may be selected, for example, from a group of predefined response structures, such as one of binary response structure 600, conditional response structure 610, or value response structure 620.

Process 800 may additionally include receiving the query response and updating network capability mapping (block 840). For example, controller 120 may receive the response and integrate the response with responses from other forwarding boxes 110 to generate a network service map (e.g., service map 760) that is targeted toward provision of a particular service or services.

According to systems and methods described herein, a controller network device, in a network control layer of a service provider network, may receive one or more parameters of interest for providing particular services over a service provider network and may provide, to a forwarding network device in a network resources layer of the service provider network, a capabilities query. The capabilities query may include a feature type identifier for a feature required to support the parameters of interest. The controller network device may receive, from the forwarding network device, a response to the capabilities query. A format for the response may be one of a binary response format, a conditional response format, or a value response format. The controller network device may compile the response with responses from other forwarding network devices to define a network map for supporting the particular services.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, although network environment 100 includes a separate controller 120 and orchestration server 125, according to other embodiments, these devices may be combined or their functions distributed among different components within network environment 100. An another example, while series of blocks have been described with respect to FIG. 8, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
   receiving, by a controller network device, one or more necessary parameters for providing particular services over a service provider network;
   providing, by the controller network device and to a forwarding network device, a capabilities query, wherein the capabilities query includes a feature type identifier for a feature required to support the one or more necessary parameters;
   receiving, by the controller network device and from the forwarding network device, a response to the capabilities query, wherein the response includes the feature type identifier and wherein a format for the response is one selected from a group of predefined response structures including a binary response format, a conditional response format, and a value response format; and
   compiling, by the controller network device, the response with responses from other forwarding networking devices, wherein the compiled responses define a network map for supporting the particular services.

2. The method of claim 1, wherein the one or more parameters include parameter for supporting Priority Flow Control (PFC) or Datagram Congestion Control Protocol (DCCP).

3. The method of claim 1, wherein the capabilities query is provided over a southbound interface in a software defined networking (SDN) environment.

4. The method of claim 3, wherein the controller network device is included within a network control layer of the service provider network, and wherein the forwarding network device is included within a network resource layer of the service provider network.

5. The method of claim 1, wherein the forwarding network device and the other forwarding network devices are part of a federation of forwarding network devices, and wherein the federation of forwarding network devices includes forwarding network devices from different vendors.

6. The method of claim 1, wherein the capabilities query further identifies one of the binary response format, the conditional response format, or the value response format to be used in the response.

7. The method of claim 1, wherein the conditional response format includes a field to identify capabilities that must be active on the forwarding network device to support a feature corresponding to the feature type identifier.

8. The method of claim 7, wherein the value response format includes a value that corresponds to a capability of the forwarding network device for the feature corresponding to the feature type identifier.

9. The method of claim 8, wherein the binary response format includes an indication of whether the forwarding network device supports the feature corresponding to the feature type identifier.

10. The method of claim 9, wherein the capabilities query includes the feature type identifier for one or more of:
    packets-per-second that the forwarding network device can support,
    entry updates per second,
    media access and control (MAC) table size,
    a buffer size,
    a number of queues,
    a number of adjacencies per routing protocol,
    a maximum number of tunnels or virtual LANs (VLANs),
    a number of physical interfaces,
    a minimum granularity for policers, or
    a rate of locally-generated packets.

11. The method of claim 1, further comprising:
    discovering, by the controller network device, the forwarding network device within the service provider network, wherein the discovering triggers providing the capabilities query.

12. The method of claim 11, wherein the discovering includes performing an auto-discovery process to identify the forwarding network device as available for providing services within the service provider network.

13. The method of claim 1, wherein the receiving the one or more parameters triggers providing the capabilities query.

14. The method of claim 13, further comprising:
    receiving, by the forwarding network device, the capabilities query;
    identifying, by the forwarding network device, the format for the response and data for the response; and
    providing, by the forwarding network device, the response to the controller network device.

15. A system, comprising:
    a controller network device in a network control layer of a service provider network to:
       receive one or more necessary parameters for providing particular services over a service provider network;
       provide, to a forwarding network device in a network resources layer of the service provider network, a capabilities query, wherein the capabilities query includes a feature type identifier for a feature required to support the one or more necessary parameters;
       receive, from the forwarding network device, a response to the capabilities query, wherein the response includes the feature type identifier and wherein a format for the response is one selected from a group of predefined response structures including a binary response format, a conditional response format, and a value response format; and
       compile the response with responses from other forwarding network devices, wherein the compiled responses define a network map for supporting the particular services.

16. The system of claim 15, further comprising:
the forwarding network device in the network resources layer of the service provider network to:
receiving the capabilities query;
identify the format for the response and data for the response; and
provide the response to the controller network device.

17. The system of claim 15, wherein the controller network device provides the capabilities query over a southbound interface in a software defined networking (SDN) environment.

18. The system of claim 15, wherein the forwarding network device and the other forwarding network devices are part of a federation of forwarding network devices using a software defined networking architecture, and wherein the federation of forwarding network devices includes forwarding network devices from different vendors.

19. A non-transitory computer-readable medium, storing instructions executable by one or more processors, the non-transitory computer-readable medium comprising one or more instructions to:
receive one or more parameters for providing particular services over a service provider network using a software defined networking (SDN) environment;
provide, to a forwarding network device in a network resources layer of the service provider network, a capabilities query, wherein the capabilities query includes a feature type identifier;
receive, from the forwarding network device, a response to the capabilities query, wherein the response includes the feature type identifier and wherein a format for the response is one selected from a group of predefined response structures including a binary response format, a conditional response format, and a value response format; and
compile the response with responses from other forwarding network devices, wherein the compiled responses define a network map for supporting the particular services.

20. The non-transitory computer-readable medium of claim 19, further comprising one or more instructions to:
discover the forwarding network device within the service provider network, wherein in the discovering triggers providing the capabilities query.

* * * * *